(12) United States Patent
Schenk

(10) Patent No.: US 6,669,205 B2
(45) Date of Patent: Dec. 30, 2003

(54) RETAINER GASKET WITH PRESSURE RELIEF VENTS

(75) Inventor: Douglas C. Schenk, Chula Vista, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 23 days.

(21) Appl. No.: 10/091,230

(22) Filed: Mar. 5, 2002

(65) Prior Publication Data
US 2002/0140182 A1 Oct. 3, 2002

Related U.S. Application Data
(60) Provisional application No. 60/279,503, filed on Mar. 28, 2001.

(51) Int. Cl.[7] .................................. F16J 15/46
(52) U.S. Cl. .................. 277/628; 277/608; 277/612; 277/613; 277/615; 277/630; 285/355; 285/910
(58) Field of Search ................... 277/628, 612, 277/613, 630, 615, 608; 285/355, 910

(56) References Cited

U.S. PATENT DOCUMENTS

| | | | |
|---|---|---|---|
| 1,590,357 A | 6/1926 | Feisthamel | |
| 1,931,922 A | 10/1933 | Damsel et al. | |
| 2,110,825 A | 3/1938 | Archer | |
| 2,192,739 A | 3/1940 | Goetze | |
| 2,200,212 A | 5/1940 | Bohmer, Jr. et al. | |
| 2,247,609 A | 7/1941 | Devilbiss | |
| 2,269,486 A | 1/1942 | Santoro | |
| 2,320,107 A | 5/1943 | Speckert | |
| 2,339,478 A | 1/1944 | Hoheisel | |
| 2,339,479 A | 1/1944 | McCreary | |
| 2,513,178 A | 6/1950 | Jackson | |
| 2,532,891 A | 12/1950 | Chupp | |
| 2,576,673 A * | 11/1951 | Cole | 277/380 |
| 2,679,241 A | 5/1954 | Dickson | |
| 2,779,420 A | 1/1957 | Stevenson | |
| 2,828,987 A | 4/1958 | Schmitz | |
| 2,857,184 A | 10/1958 | Mancusi, Jr. | |
| 2,872,961 A | 2/1959 | Mills et al. | |
| 2,882,083 A | 4/1959 | Palumbo et al. | |
| 2,900,199 A * | 8/1959 | Logan | 277/614 |
| 2,906,552 A | 9/1959 | White | |
| 2,914,350 A | 11/1959 | Smith | |
| 2,915,322 A | 12/1959 | Dunlop | |
| 3,011,803 A | 12/1961 | Buckner et al. | |
| 3,061,321 A * | 10/1962 | Smith | 277/637 |
| 3,100,656 A | 8/1963 | MacArthur | |

(List continued on next page.)

FOREIGN PATENT DOCUMENTS

| | | |
|---|---|---|
| GB | 126244 | 5/1919 |
| WO | WO 96/31724 | 10/1996 |

OTHER PUBLICATIONS

Parker Seals Group Spirotallic® Spiral Wound Gaskets—Copyrighted 1981.

Parker Seals Group Parmite Spirotallic™ Gasket—Copyrighted 1985.

(List continued on next page.)

Primary Examiner—J. J. Swann
Assistant Examiner—Carlos Lugo
(74) Attorney, Agent, or Firm—John A. Molnar, Jr.

(57) ABSTRACT

A gasket for interposition between a first and an opposing second interface surface of a sealing assembly. The gasket includes a retainer and a generally annular seal element received in a groove formed into at least one side of the retainer. Such retainer side further is formed as having one or more channels extending extend radially through the groove and the inner or outer perimeter of the retainer. Each such channel defines a vent for relieving hydrostatic fluid pressure as the gasket is compressed between the interface surfaces.

39 Claims, 6 Drawing Sheets

U.S. PATENT DOCUMENTS

| Patent | | Date | Inventor | Ref |
|---|---|---|---|---|
| 3,167,322 | A | 1/1965 | Aichroth | |
| 3,167,333 | A | 1/1965 | Hall et al. | |
| 3,195,906 | A | 7/1965 | Moyers | |
| 3,215,442 | A | 11/1965 | Papenguth | |
| 3,231,289 | A | 1/1966 | Carrell | |
| 3,259,404 | A | 7/1966 | Papenguth | |
| 3,302,953 | A | 2/1967 | Glasgow | |
| 3,317,214 | A | 5/1967 | Durgom | |
| 3,404,061 | A | 10/1968 | Shane et al. | |
| 3,462,161 | A * | 8/1969 | Daubenberger et al. | 277/606 |
| 3,472,533 | A * | 10/1969 | Turner | 285/55 |
| 3,524,662 | A | 8/1970 | Tolman et al. | |
| 3,529,837 | A | 9/1970 | Eaton et al. | |
| 3,578,346 | A | 5/1971 | Jelinek | |
| 3,606,348 | A | 9/1971 | Taylor | |
| 3,635,480 | A | 1/1972 | Bain et al. | |
| 3,687,494 | A | 8/1972 | Graff | |
| 3,720,420 | A | 3/1973 | Jellnek et al. | |
| 3,737,169 | A | 6/1973 | Glynn | |
| 3,748,348 | A | 7/1973 | Stone | |
| 3,871,668 | A | 3/1975 | Coker et al. | |
| 4,026,565 | A | 5/1977 | Jelinek | |
| 4,042,020 | A | 8/1977 | Wellstein | |
| 4,081,083 | A * | 3/1978 | Glauser et al. | 213/76 |
| 4,161,043 | A | 7/1979 | Flores | |
| 4,174,846 | A | 11/1979 | Scott | |
| 4,272,109 | A | 6/1981 | Ahlstone | |
| 4,294,477 | A | 10/1981 | Ahlstone | |
| 4,305,595 | A | 12/1981 | Miyagishima et al. | |
| 4,377,302 | A | 3/1983 | Kohyama et al. | |
| 4,433,862 | A | 2/1984 | Raulins et al. | |
| 4,471,965 | A | 9/1984 | Jennings et al. | |
| 4,489,963 | A | 12/1984 | Raulins et al. | |
| 4,519,619 | A | 5/1985 | Doyle | |
| 4,537,406 | A * | 8/1985 | Hirasuna et al. | 277/1 |
| 4,625,978 | A * | 12/1986 | Jelinek | 277/180 |
| 4,676,515 | A | 6/1987 | Cobb | |
| 4,679,831 | A * | 7/1987 | Kielminski | 285/332.2 |
| 4,690,438 | A | 9/1987 | Kanczarek | |
| 4,706,997 | A | 11/1987 | Carstensen | |
| 4,708,038 | A | 11/1987 | Hellnick et al. | |
| 4,711,474 | A * | 12/1987 | Patrick | 285/332.2 |
| 4,770,448 | A | 9/1988 | Strickland et al. | |
| 4,802,698 | A | 2/1989 | Fujisawa et al. | |
| 4,846,507 | A | 7/1989 | Geary | |
| 4,872,712 | A | 10/1989 | Maier | |
| 4,875,713 | A | 10/1989 | Carstensen | |
| 4,878,285 | A | 11/1989 | Carstensen | |
| 4,988,127 | A | 1/1991 | Cartensen | |
| 5,015,017 | A | 5/1991 | Geary | |
| 5,066,052 | A | 11/1991 | Read | |
| 5,263,748 | A | 11/1993 | Carstensen | |
| 5,316,320 | A | 5/1994 | Breaker | |
| 5,330,239 | A | 7/1994 | Blose et al. | |
| 5,333,919 | A | 8/1994 | Nerenberg | |
| 5,343,798 | A | 9/1994 | Meisinger et al. | |
| 5,348,350 | A | 9/1994 | Blose et al. | |
| 5,355,961 | A | 10/1994 | Gariepy et al. | |
| 5,421,594 | A | 6/1995 | Becerra | |
| 5,427,386 | A | 6/1995 | Breaker | |
| 5,468,029 | A | 11/1995 | Blose et al. | |
| 5,498,035 | A | 3/1996 | Blose et al. | |
| 5,511,797 | A | 4/1996 | Nikirk et al. | |
| 5,518,257 | A | 5/1996 | Breaker | |
| 5,518,280 | A | 5/1996 | Mann | |
| 5,558,344 | A | 9/1996 | Kestly et al. | |
| 5,564,715 | A * | 10/1996 | Wallace | 277/58 |
| D383,378 | S | 9/1997 | Schrader et al. | |
| 5,769,466 | A | 6/1998 | Noel et al. | |
| 5,823,542 | A | 10/1998 | Owen | |
| 5,851,037 | A | 12/1998 | Bridges | |
| 5,938,246 | A | 8/1999 | Wallace et al. | |
| 5,944,319 | A | 8/1999 | Kohlman | |
| 5,944,322 | A | 8/1999 | Coff et al. | |
| 6,419,237 | B1 * | 7/2002 | More | 277/602 |

OTHER PUBLICATIONS

Fluid Sealng Associated Technical Handbook Second Edition, Metallic Gasket Division—Copyrighted 1979.

U.S. patent application Ser. No. 09/922,410; filed Aug. 3, 2001 entitled "Threaded Pipe Connection with Improved Seal" (copy not included as application has not been published).

* cited by examiner

RETAINER GASKET WITH PRESSURE RELIEF VENTS

CROSS-REFERENCE TO RELATED CASES

The present application claims the benefit of the filing date of U.S. Provisional Application Ser. No. 60/279,503; filed Mar. 28, 2001.

BACKGROUND OF THE INVENTION

The present invention relates broadly to a sealing construction for providing a fluid seal intermediate a pair of opposed, mating parts or structures, and more particularly to a pressure-venting gasket construction adapted to provide a face seal within threaded couplings for pipes, shafts, lines, or other tubular members.

In basic construction, gaskets of the type herein involved are formed of a relatively compressible, annular seal member having a central aperture configured for registration with the corresponding margins of a pair of mating surfaces. The seal member is supported by an annular metal or plastic retainer which may be machined, stamped, molded or otherwise formed to conform to the surface geometry of the mating surfaces. Particularly, the seal member may be molded-in-place or mounted in a groove formed into one or both sides of the retainer, or about the inner and/or outer periphery of the retainer to form an integral gasket structure. Representative such gaskets are shown, for example, in U.S. Pat. Nos. 3,195,906; 3,215,442; 3,259,404; 3,578,346; 3,635,480; 3,720,420; 3,746,348; 4,026,565, 4,625,978, and are marketed commercially by the O-Seal Division of Parker-Hannifin Corporation, San Diego, Calif., under the tradenames "Gask-O-Seal" and "Integral Seal."

Retainer gaskets of the type herein involved are employed in a variety of sealing applications, such as in commercial, industrial, or military equipment, vehicles, or aircraft for compression between the opposing or faying surfaces of a pair of mating parts or structures to provide a fluid-tight interface sealing thereof. In service, the gasket is clamped between the mating surfaces to effect the compression and deformation of the seal member and to develop a fluid-tight interface with each of those surfaces. The compressive force may be developed using a circumferentially spaced-apart arrangement of bolts or other fastening members, or by a threaded engagement of the mating parts.

Particularly for oil well drilling assemblies such as described in U.S. Pat. Nos. 4,846,507 and 5,015,017, as well as for other applications involving the sealing of casings, tubing, pipes, lines, or other tubular members connected by means of a threaded pipe joint or other coupling, there exists a need to relieve internal hydrostatic fluid pressure which may be developed as a result of threading compound or other fluid being trapped between the threads of the coupling and the tubular members being joined. In this regard, damage to the gasket and/or the to the joint may result if the pressure which is developed is not relieved from the joint as the parts are being threadably engaged.

In view of the foregoing, it is believed that improvements in retainer gaskets for the oil drilling and other applications would be well-received by the industries concerned. A preferred gasket construction would be economical to manufacture, but also would exhibit reliable sealing performance. Such a gasket additionally would allow for the venting of internally-developed fluid pressure.

BROAD STATEMENT OF THE INVENTION

The present invention is directed to a retainer gasket construction particularly adapted for venting hydrostatic pressure between a pair of mating interface surfaces which pressure is developed from a source of fluid trapped as one or both of the surfaces are displaced to compress the gasket in forming a fluid-tight seal therebetween. The mating interfaces surfaces may be, particularly, an end face of an internally or externally-threaded pipe, shaft, or tubing, or other tubular member, and a shoulder, ledge, land, or other confronting surface of a matingly-threaded coupling which may be used for joining the tubular member to another such member. The gasket of the invention may be interposed and compressed between the interface surfaces to provide a fluid-tight seal therebetween.

The fluid source may be joint compound which is commonly applied as a lubricant and/or sealant to the threads of the member and/or coupling. As the member and coupling are screwed together, the compound is extruded from the enmeshing threads and may become trapped between the mating interface surfaces. Thereupon, the compound may be compressed as the interface surfaces progress towards one another. If the compound is allowed to remain within the joint being formed, a hydrostatic fluid pressure may be developed having the potential to hydraulically damage the gasket and/or the mating parts. The gasket of the invention is provided with a venting feature which allows for the relief of the developing fluid pressure, but which, advantageously, does not interfere with the sealing function of the gasket.

The gasket herein involved is generally of a closed geometric shape and includes a generally planar, preferably metal, retainer and one or more seal elements supported on at least one and, typically, both sides of the retainer. Advantageously, the retainer advantageously delimits the compression of the seal elements to avoid an avoid-compressed condition, and also provides for a direct load path between the interface surfaces to accommodate the development of high tensile stresses with a minimum of torque loss.

The seal elements each may be molded of an elastomeric material in an associated groove formed into a corresponding one of the sides of the retainer. Each of the seal elements may be formed as having a bead or other configuration which is abuttingly contactible in a free state with a corresponding one of the interfaces surfaces, and which is compressible axially thereby into an energized state effecting a fluid-tight seal between the interface surface and the facing side of the gasket. One or more channels are formed through side of the retainer to couple an unfilled void volume formed between each of the compressed seal elements and the corresponding interface surface into fluid communication with an internal or external environment for the venting of the entrapped joint compound or other fluid from the void volume.

To facilitate the installation of the gasket between the interface surfaces, the gasket further may be formed as having a generally annular elastomeric locating member supported circumferentially about the inner or outer perimeter of the retainer. With such member being molded or otherwise attached to the outer perimeter of the retainer, the gasket may be coaxially mounted and retained within, for example, an internal gland of the coupling to be shipped therewith to the job site.

The present invention, accordingly, comprises the apparatus possessing the construction, combination of elements, and arrangement of parts and steps which are exemplified in the detailed disclosure to follow. Advantages of the present invention include a sealing gasket construction which is adapted to vent entrapped fluid but which also exhibits reliable sealing properties and torque retention with a minimum of compression set. Additional advantages include a gasket construction which may be adapted for use with various sealing assembly configurations, and particularly which may be configured to be mounted internally within a coupling for a threaded connection with a pipe, shaft, or tubing end. Further advantages include a gasket construction which is economical to manufacture, and which may be made self-locating, retaining, and aligning to simplify and expedite installation. These and other advantages will be readily apparent to those skilled in the art based upon the disclosure contained herein. Advantageously, the gasket construction of the present invention.

BRIEF DESCRIPTION OF THE DRAWINGS

For a fuller understanding of the nature and objects of the invention, reference should be had to the following detailed description taken in connection with the accompanying drawings wherein.

Figure 1:
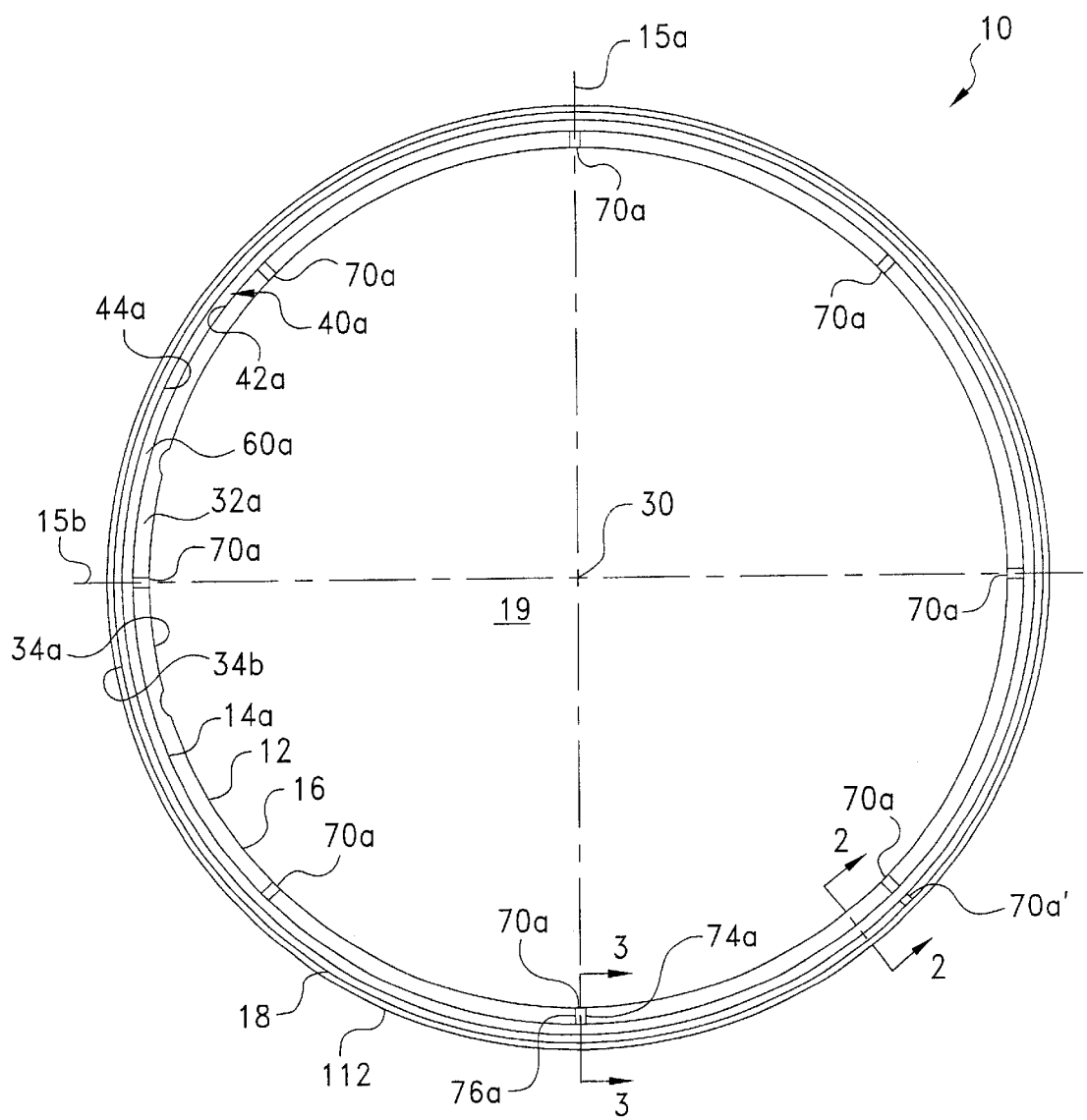
FIG. 1 is a plan view of a representative embodiment of a gasket construction according to the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the venting gasket construction of the present invention are described in connection with the configuration thereof for use as a seal between the interface surfaces of a coupling and an end of a pipe, shaft, tubing, or other tubular member configured for a threaded engagement with the coupling. Assemblies of such type are shown, for example, in U.S. Pat. Nos. 5,015,017 and 4,846,507. In view of the discourse to follow, however, it will be appreciated that aspects of the present invention may find utility in other fluid sealing applications requiring a flexible gasket of the type herein involved. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, shown generally at 10 in FIG. 1 is a representative embodiment according to the present invention of an pressure-venting gasket configured for interposition between a mating pair of mutually-opposed interface surfaces. In basic construction, gasket 10 includes a generally annular and planar retainer, 12, and a pair of generally annular seal elements, 14a–b, each supported on a corresponding side of the retainer and extending along at least a portion thereof to be compressible intermediate the interface surfaces (not shown in FIG. 1) for effecting a fluid-tight seal therebetween.

Figure 2:
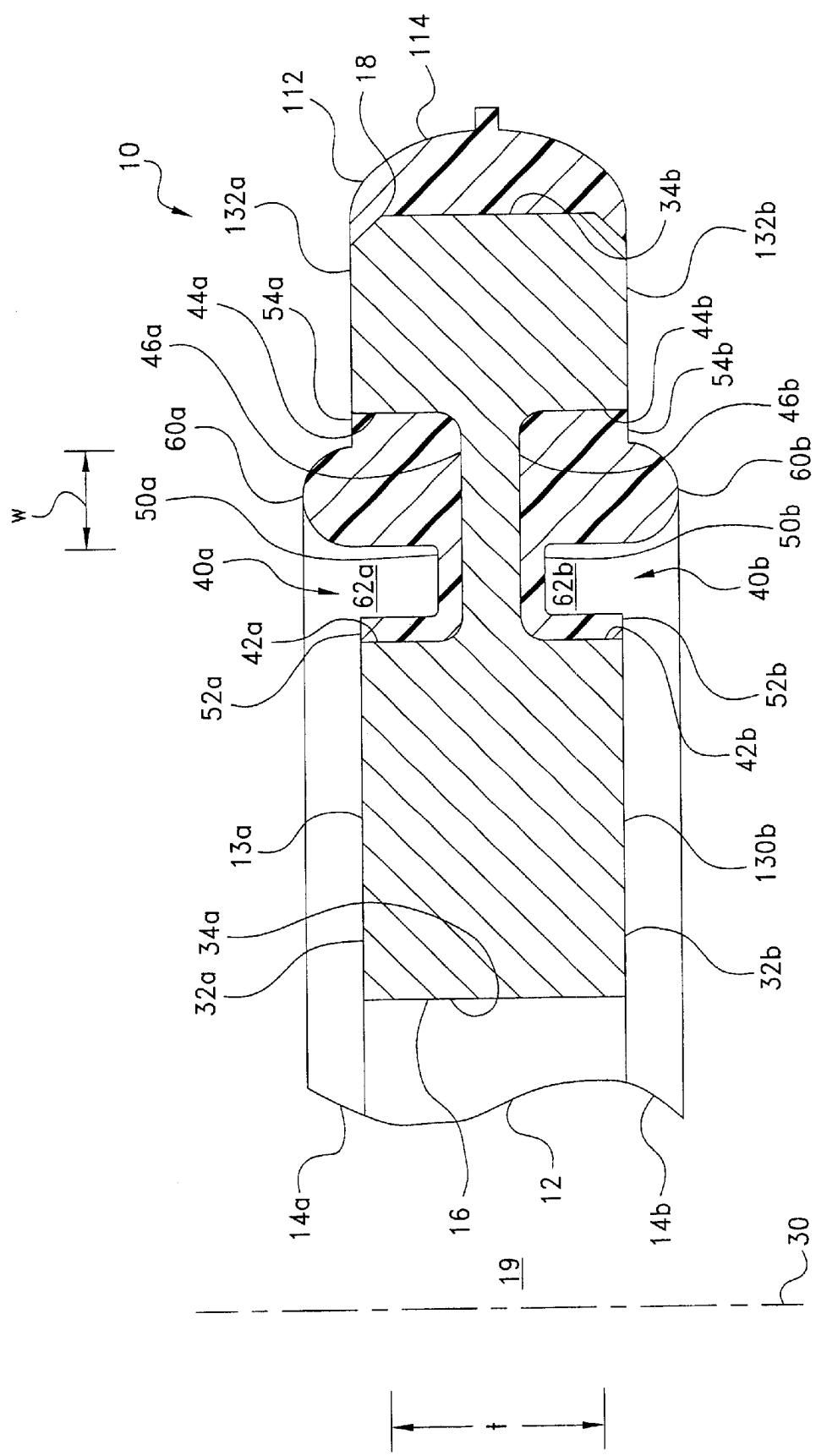
FIG. 2 is a magnified, fragmentary cross-sectional view of the gasket of FIG. 1 taken through line 2—2 of FIG. 1.
Figure 3:
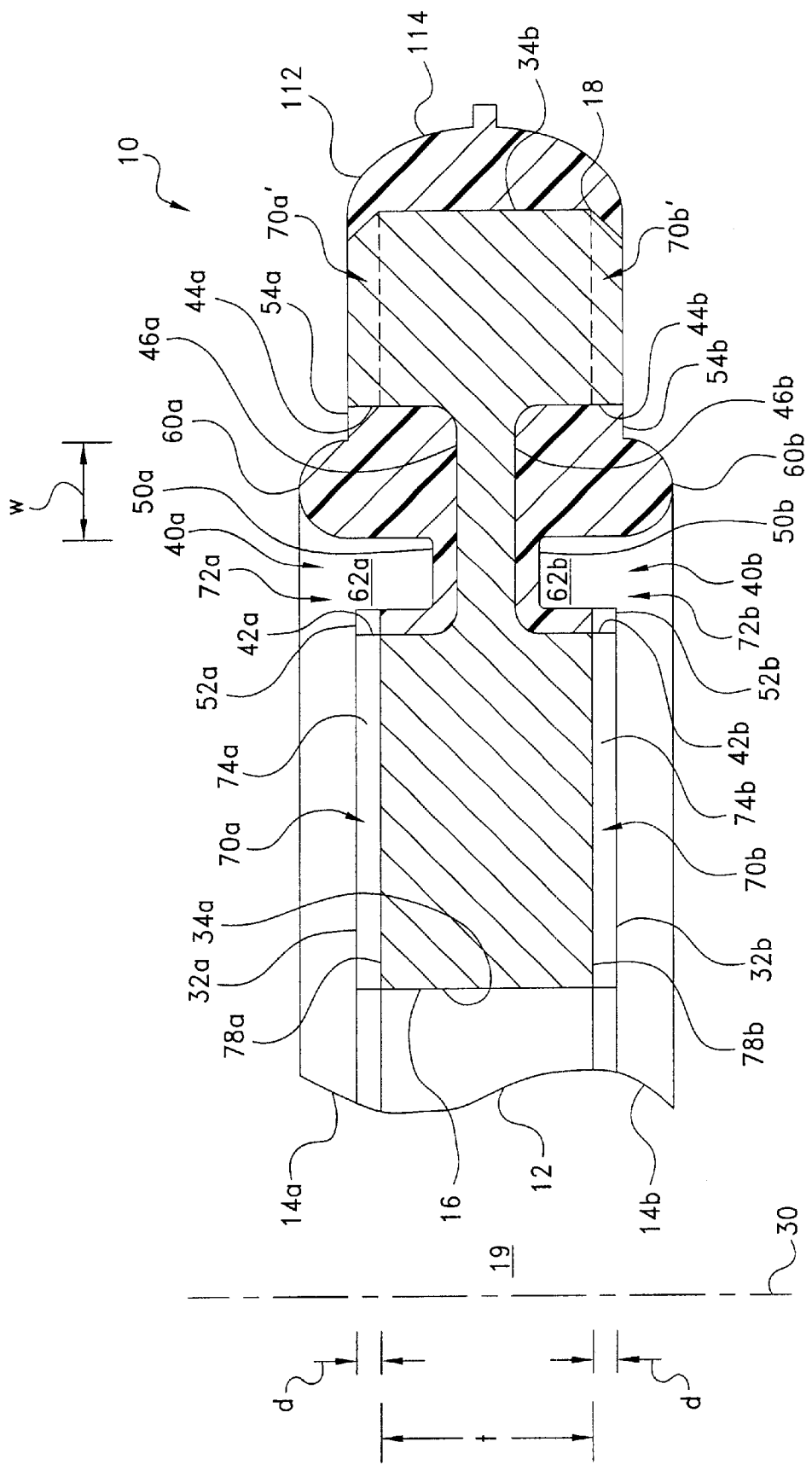
FIG. 3 is a magnified, fragmentary cross-sectional view of the gasket of FIG. 1 taken through line 3—3 of FIG. 1.

With additional reference to the cross-sectional views of FIGS. 2 and 3, retainer 12 extends in the radial directions defined by the orthogonal horizontal or radial axes referenced at 15a–b in FIG. 1 as having an inner perimeter or margin, referenced at 16, and an outer perimeter or margin, referenced at 18. Together, the inner and outer perimeters 16 and 18 define a closed geometric shape which, in turn, encloses an opening, 19. Although the shape of retainer 12 is shown for purposes of illustration to be generally circular, such shape alternatively may be elliptical, circular, or otherwise arcuate, or regular or irregular polygonal or otherwise rectilinear depending upon the intended application.

With particular reference to cross-sectional views of FIG. 2 and, retainer 12 further is formed relative to a central or vertical axis, referenced at 30 in FIGS. 2 and 3, which axis extends in an axial direction generally normal to the radial direction referenced by axes 15, as having mutually-opposing upper and lower radial surfaces, 32a–b, respectively, and mutually-opposing inner and outer axial surfaces, 34a–b, respectively. Radial surfaces 32 each may be generally planar and extend generally perpendicular to axis 30 intermediate the inner and the outer perimeter 16 and 18 of the retainer 12, with the axial surfaces 34 each extending generally parallel to axis 30 in defining the corresponding inner and outer perimeters 16 and 18 of the retainer. Returning to the plan view of FIG. 1, the inner and outer perimeters 16 and 18 of retainer 12 generally define, respectively, the inner and outer diametric extents of gasket 10 which are sized such that the gasket is receivable intermediate the interface surfaces to be sealed.

Retainer 12 itself may be fabricated from a metal, plastic, or other material which may be machined, cast, molded, or stamped. Suitable metal materials for the construction of retainer 12 include aluminum, steel, stainless steel, copper, brass, titanium, nickel, and alloys thereof, with aluminum being preferred for many applications. The metal may be anodized, plated, or otherwise for increased corrosion resistance. Depending upon its material of construction and the intended application, retainer 12 may have an axial thickness, referenced at "t" in FIG. 2, defined between radial surfaces 32a–b of between about 1/16–1 inch (0.15–2.5 cm), making the retainer generally rigid within the joint to be assembled.

As is shown in the several views of FIGS. 1–3, retainer 12 further is formed as having an axially-registered pair of mounting grooves, 40a–b, each of which may be machined or otherwise recessed into a respective one of the radial surfaces 32 of retainer 12 intermediate the inner and outer perimeter 16 and 18 thereof, and as extending substantially continuous along the closed geometry of the retainer. As may be seen best in FIG. 2, each of the grooves 40, which may be disposed generally coaxially the opening 19, each are formed to define a generally U-shaped channel including an axial inner sidewall, 42a–b, adjacent the inner perimeter 16, and an opposing axial outer sidewall, 44a–b, adjacent the outer perimeter 18 which is disposed a spaced-apart radial distance from the corresponding inner sidewall 42. A radial bottom wall, 46a–b, extends intermediate a corresponding pair of the inner and outer sidewalls 42 and 44.

As also may be seen best in FIG. 2, each of the seal elements 14 may be formed with a corresponding groove 40 as having a base portion, 50a–b supported on a bottom wall 46, and inner and outer lateral portions, 52a–b and 54a–b, respectively, supported on a corresponding inner or outer sidewall 42 or 44, and as having bead or lobe portion, 60a–b, each contactible by one of the interface surfaces for the axial sealing compression of the seal elements within the intended application. In this regard, depending upon the location of such interface surface relative to the gasket 10, each of the bead portions 60 may be spaced equidistant from the sidewalls 42 and 44 or, alternatively, oriented to one or the other side so as to define an annular gap with the outer sidewall 44 or, and as is shown at 62a–b, with the inner sidewall 42. Bead portions 60 may be of any radial size, but typically will have a width, referenced at "w" in FIGS. 2 and 3, which, depending upon the size of the groove 40, may be between about 0.030–0.125 inch (0.75–3 mm).

Within grooves 40, each of the bead portions 60 present oppositely disposed, generally hemispherical bearing surfaces which in the illustrated embodiment define a first and a second radial sealing surface of the gasket 10. As may be seen in FIG. 1 for surface 60a, such sealing surfaces extend along the generally circular geometry of retainer 12 for coaxial registration with the margins of the interface surfaces which may surround, for example, a fluid flow passageway or chamber. It will be appreciated, however, that different and/or independent geometries of seal elements 14a–b and, similarly, bead portions 60 and their surfaces may be envisioned depending upon the configuration of the corresponding passageway or chamber, and/or of the interfacing surfaces within the intended application.

For the axial compression of the seal elements 14 by the interface surfaces effecting a fluid-tight seal therewith, the bead portions 60 thereof may be provided, again as depending upon the geometry of the interface surfaces, to extend axially beyond the corresponding radial surface 18 of retainer 12 for abutting contact with a corresponding one of the interface surfaces. That is, bead portions 60 may be provided, as is shown in FIG. 2 to protrude between about 1–100 mils (0.025–2.5 mm) beyond the corresponding radial surface 32, with the gap portions 62 being provided to accommodate the deformation of the bead portions 60 such that the surfaces thereof each may lie coplanarly with a corresponding one of the retainer surfaces 32 when the seal elements 14 are energized between the interface surfaces.

Bead portions 60 may be single as shown or, alternatively, double to provided redundant sealing surfaces for each of the interface surfaces.

As aforementioned, retainer 12 may be formed as a metal stamping with grooves 40 being stamped or machined therein. With retainer 12 being provided as has been described, each of the seal elements 14 may be adhesively bonded, interference fit or, preferably, molded, or otherwise attached to or supported on walls 42, 44, and 46 of each groove 40 as a preferably continuous or, alternatively, discontinuous or segmented annulus of an elastomeric material. For the attachment of the seal elements 14 to the groove walls, the surfaces thereof may be primed with a siloxane, silane, or other bonding agent. The primed retainer 12 then may be placed into a heated molded cavity for the injection, compression, or transfer molding of an uncured rubber or other elastomeric compound forming the integral seal elements. Each of the seal elements thereby may be formed and cured-in-place as vulcanized directly onto retainer 12. Alternatively, the elastomeric elements may be molded in a separate operation and otherwise bonded using an adhesive or interference fit into the groove 40.

Seal elements 14 may be formed of a synthetic rubber which specifically may be selected for high temperature performance or otherwise for compatibility with the fluid being handled. Suitable materials include natural rubbers such as Hevea, as well as thermoplastic, i.e., melt-processible, or thermosetting, i.e., vulcanizable, synthetic rubbers such as fluoropolymers, chlorosulfonate, polybutadiene, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Advantageously, seal elements 14 exhibit a reduced yield stress as compared to retainer 12 and, accordingly, are deformable for conforming to irregularities existing between the interface surfaces of the pipe flanges. As will be more fully appreciated hereinafter, as given compressive load is applied to the seal elements 14, an increased bearing stress is provided thereon by virtue of the reduced surface area contact of the bearing surfaces of the bead portions 60 on the interface surfaces. This increased stress will be sufficient to exceed the reduced yield stress of the seal elements 14 for the deformation thereof effecting the fluid-tight sealing of the interfacing surfaces. Indeed, the seal elements may be used to effect a hermetic seal which is especially useful in petrochemical and other applications to control the fugitive emission of VOC's and other pollutants.

In service, it will be observed that the combination of a relatively incompressible retainer 12 and the relatively compressible seal elements 14 provides a gasket construction which minimizes torque loss and thereby obviates much of the need for the periodic re-torquing of the members being joined. That is, it is well-known that gaskets of the type herein involved may develop a compression set which is manifested by fluid leaks as the tension in the joint is relaxed and the fluid-tight sealing of the interfacing surfaces is compromised. In this regard, the provision of bead portions 60 ensures positive sealing, with retainer 12, in turn, synergistically providing generally a compression stop and non-yielding contact in establishing an alternative load torque path minimizing the compression set and leak potential of the gasket 10. Thus, the use of a retainer allows the mating parts to bear stress loads which otherwise would cause the deformation or extrusion of a gasket which lacked a retainer. In the case of a metal retainer 12, such contact additionally affords improved heat transfer between the interface surfaces, and also develops relatively high seal stresses for assured fluid-tight sealing of the interfacing structures.

Returning to the plan view of FIG. 1 and with additional reference to the cross-sectional view of FIG. 3, with the reverse side of gasket 10 hidden from view in FIG. 1 being understood to be duplicative to the side shown, it may be seen that retainer 12 is further formed as having at least one and, preferably, a plurality of channels machined, molded, stamped, or otherwise formed into each of the radial surfaces 32, such channels formed into surface 32a being commonly referenced at 70a in FIGS. 1 and 3, and with one of such channels formed into surface 32b being referenced at 70b in FIG. 3. Each of the channels 70 is formed into a corresponding radial surface 32 to extend radially through a corresponding one of the inner or outer sidewall 42 or 44 of each groove to define an opening, referenced at 72a–b in FIG. 3 therein, and through the adjacent one of the retainer inner or outer perimeter 16 or 18. In the embodiment shown in FIGS. 1–3, each of the channels may be seen to be formed though the inner sidewall 42 and the inner perimeter 16 for the venting of fluid into the opening 19 of the retainer 12. Alternatively, however, and depending upon the requirements of the particular application, channels 70 may be formed, as is shown in phantom at 70a' in FIGS. 1 and 3, and also at 70b' in FIG. 3, to each extend through the outer sidewall 44 and the outer perimeter 18 for the venting of fluid out of the retainer 12. As may be seen best in the plan view of FIG. 1 for channels 70a, each of the channels 70 may be spaced-apart radially at about the same angular distance from each adjacent channel 70.

Each of the channels 70 may be formed as having a pair of opposing axial end walls, referenced at 74a and 76a for channel 70a, and at 74b for channel 70b (with channel 70b being hidden from view in FIG. 1, and with wall 76a and the wall opposing wall 74b being hidden from view in FIG. 3), spaced-apart angularly about axis 30 to define a radial widthwise extent of the channel therebetween, and disposed generally normal the groove inner sidewall 42. Channels 70 are each further formed as having a radial bottom wall, 78a–b, extending intermediate each pair of end wall 74 and 76 such that, and as may be appreciated with reference to FIG. 3, each channel 70 has a generally U-shaped cross-section. As also may be seen in FIG. 3, each of the channel bottom walls 78 may be disposed axially generally intermediate the corresponding radial surface 32 and the corresponding groove bottom wall 46 so as to define the depth, commonly referenced at "d" in FIG. 3 of each channel which may be between about ⅛–¼ of the axial thickness t.

Figure 4A:
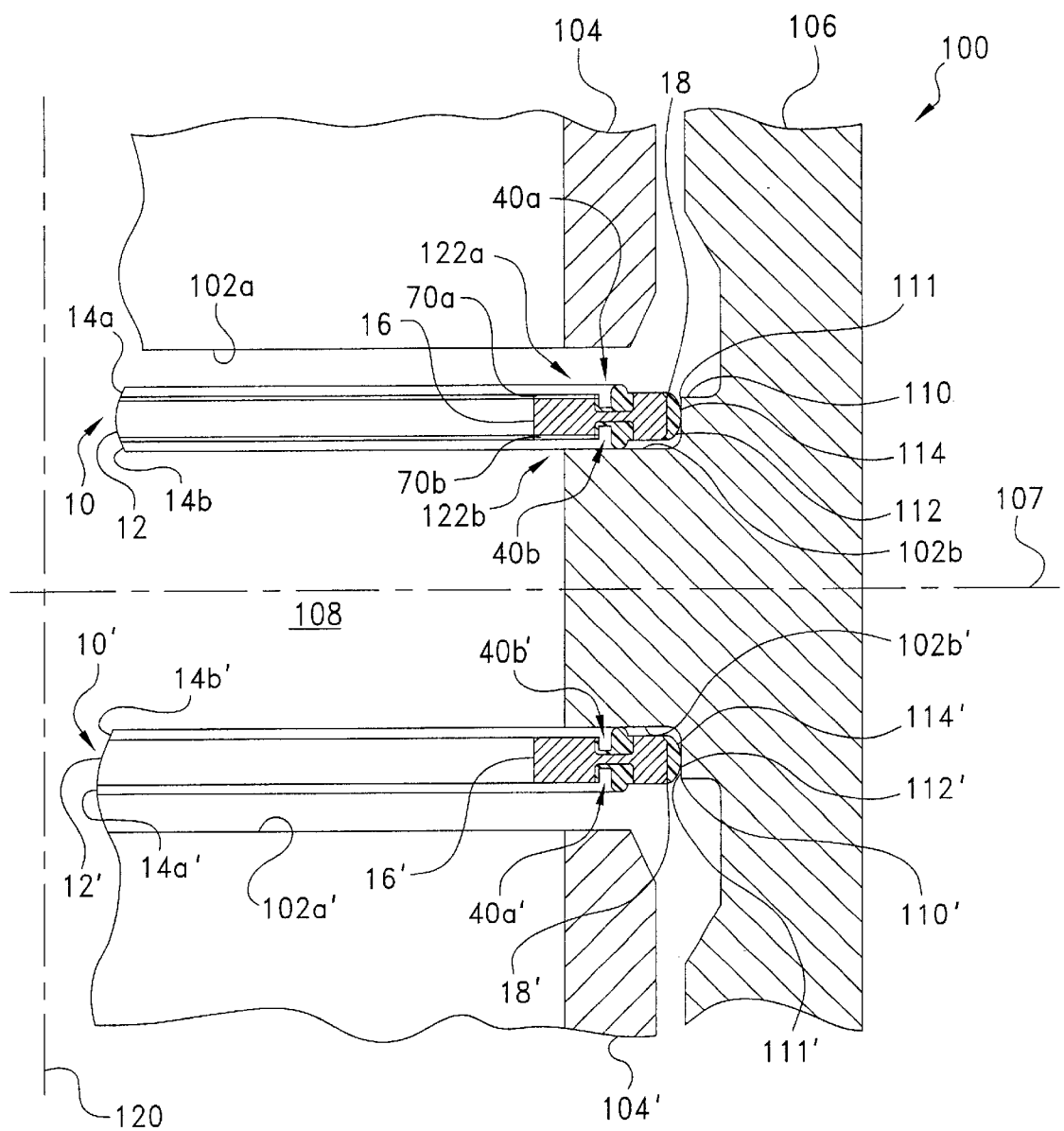
FIG. 4A is a fragmentary, cross-sectional assembly view showing a pair of the gaskets of FIG. 1 as interposed between the mating interface surfaces of a pair of pipes, shafts, or other tubular members and a threadably-engageable coupling.
Figure 4B:
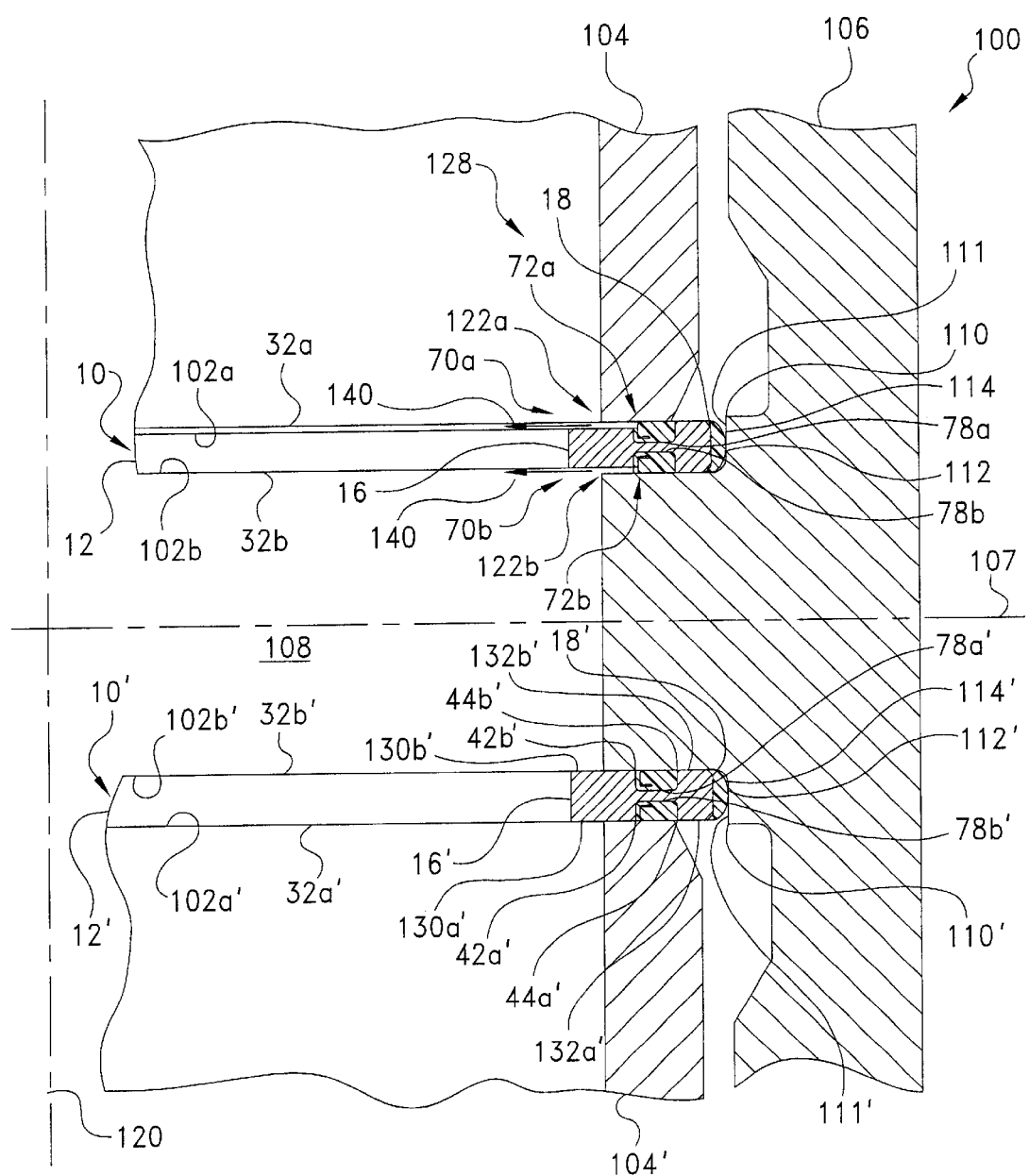
FIG. 4B is a fragmentary, cross-sectional view showing the gaskets of FIG. 1 as compressed within the assembly of FIG. 4A.

Referring now to the assembly views of FIGS. 4A and 4B, a representative joint assembly incorporating gasket 10 of the present invention is shown generally at 100. Within joint assembly 100, gasket 10 of the present invention is interposed between a pair of mutually-facing, axially spaced-apart interfaces surfaces, 102a–b, one of which surfaces, surface 102a, may be the end face of a pipe, shaft, tubing, or other tubular member, 104, and the other of which surfaces, 102b, may be an internal shoulder, ledge, land, or the like formed within a tubular coupling, 106, which is further configured for a threaded engagement with the pipe end 104. In FIGS. 4A and 4B, assembly 100 is shown to be generally symmetrical about the axis referenced at 107 such that a second gasket 10', interface surfaces 102a'-b', and pipe end 104' are provided, with the view of gasket 10 being shown to correspond to the cross-sectional view of FIG. 3, and the view of gasket 10' being shown to correspond to the cross-sectional view of FIG. 2. Coupling 106 thus is used to connect the pipe ends 104 and 104' together, with the gaskets 10 and 10' being employed to provide a fluid-tight seal between the pipe ends 104, 104' and the coupling 106 for the conveyance of fluid through the passageway, referenced at 108, thereby defined through the joined pipes and coupling. In this regard, gaskets 10 and 10' each are disposed between their associated interface surfaces 102a–b and 102a'-b' in general coaxial registration with passageway 108.

Further in this regard, each of the gaskets 10 and 10' may be received within an internal gland, 110 and 110', formed within the coupling 106. Glands 110 and 110' have a given inner diametric extent, 111 and 111', with the outer perimeters 18 and 18' of retainers 12 and 12' each being sized to be received coaxially therein. For the positive retention of the gaskets 10 and 10' within the glands, retainers 12 and 12' may be provided with a generally annular elastomeric locating member, 112 and 112', respectively. As may be seen with additional reference to FIG. 2, locating member 112, which may be formed of the same or a different elastomeric material as the seal elements 14, may be received circumferentially about the retainer outer perimeter 18 as molded, bonded, interference fit, or otherwise supported on outer axial surface 34b, and as having a select outer diametric extent, referenced at 114. Returning to FIGS. 4A and 4B, such outer diametric extent 114 and 114' of locating members 112 and 112' may be seen to be sized to interferingly engage the inner diametric extent 111 and 111' of glands 110 and 110' effecting the retention of the gaskets 10 and 10' therein.

With continuing reference to FIG. 4A, with gaskets 10 and 10' interposed therebetween, the interface surfaces 102a–b and 102a'-b' are shown to be spaced-apart along a longitudinal axis, 120, and will be understood to be axially displaceable therealong as the pipe ends 104 and 104' and/or the coupling 106 are tightened. With a corresponding one of the interface surfaces 102a–b and 102a'-b', each of the grooves 40a–b and 40a'-b' define the void volume referenced at 122a–b for gasket 10.

Figure 5:
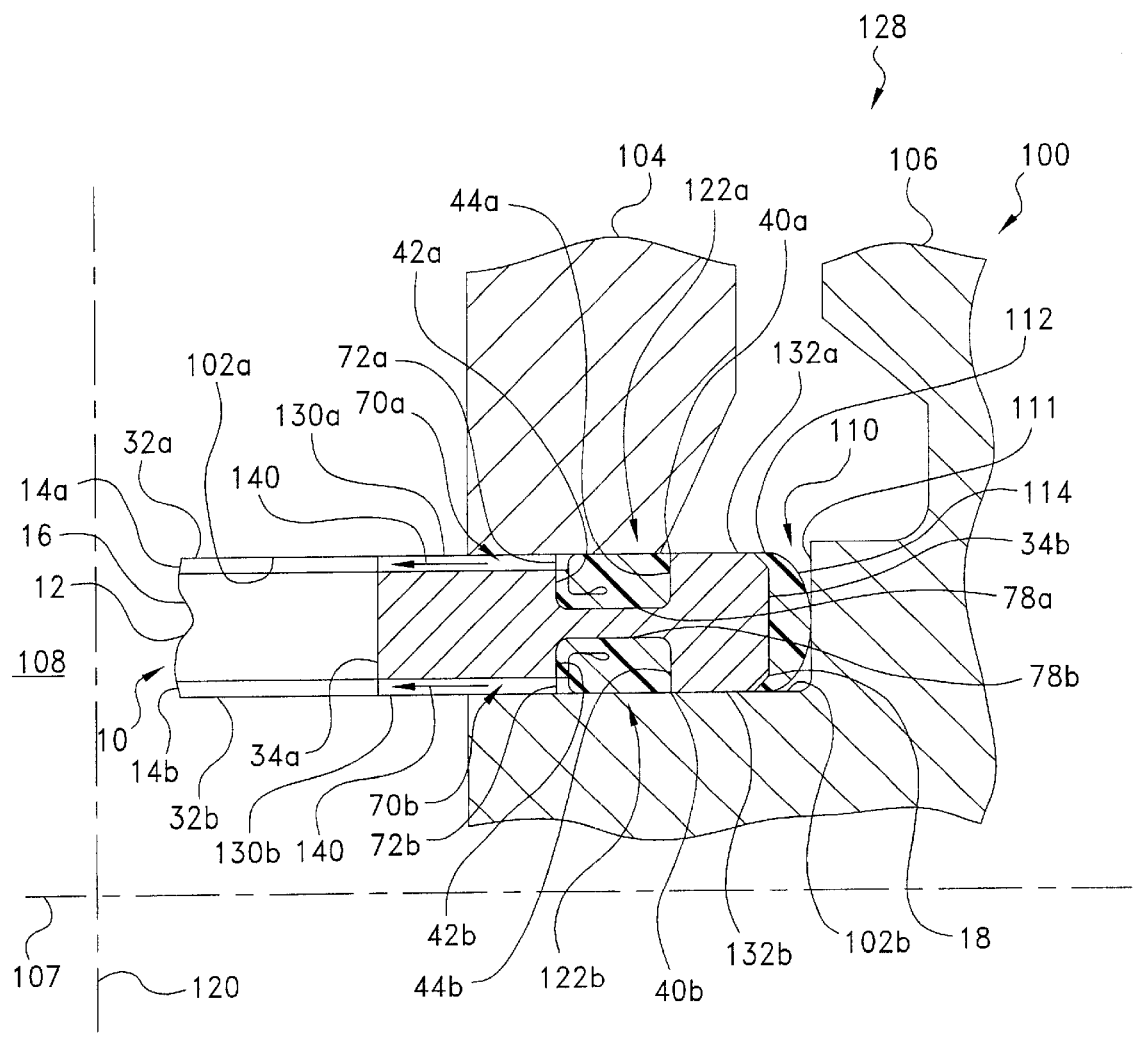
FIG. 5 is a magnified view of FIG. 4B showing the compression of one of the gaskets thereof in enhanced detail.

Turning now to FIG. 4B, and with additional reference to the magnified view of gasket 10 shown at 128 in FIG. 5, as the surfaces 102a–b and 102a'–b' are displaced into abutting contact with the corresponding radial surfaces 32a–b and 32a'–b', seal elements 14a–b and 14a'–b' each are contacted by a corresponding interface surface 102a–b or 102a'–b', and are compressed therebetween and a corresponding groove bottom wall 78a–b or 78a'–b' from the free state shown in FIG. 4A into the energized state shown in FIG. 4B effecting a generally fluid-tight seal between each of the retainers 12 and 12' and the interface surfaces 102a–b and 102a'–b'. In FIG. 4B, it may be seen that the radial surface 32a–b and 32a'–b' of each of the gaskets 10 and 10' each define a radial inner portion, referenced at 130a'–b' for gasket 10' and at 130a–b in FIGS. 2 and 5 for gasket 10, and a radial outer portion, referenced at 132a'–b' for gasket 10' and at 132a–b in FIGS. 2 and 5 for gasket 10, between, respectively, the retainer inner perimeter 16 and 16' and the groove inner sidewall 42a–b and 42a'–b', and the retainer outer perimeter 18 and 18' and the groove outer sidewall 44a–b and 44a'–b'. Such portions 132 and 132' each provide a bearing surface contact with the corresponding one of the interface surfaces 102 and 102' and a positive stop delimiting the compression of the seal elements 14 and 14' to thereby avoid the over-compressed thereof during installation or maintenance.

In the energized state of FIG. 4B, each of the seal elements 14a–b may be seen to occupy a filled portion of the corresponding void volume 122a–b, with the remainder thereof being an empty or unfilled portion. Each of the channels 70a–b are coupled through a corresponding opening 72a–b in fluid communication with the unfilled portion a corresponding one of the void volumes 122. In this regard, each of the channels 70 define with a corresponding interface surface 102 a vent for relieving hydrostatic fluid pressure, such as from the compression of joint compound extruded from between the thread of the pipe ends 104 and the coupling 106, from the unfilled portion of the void volume and into the passageway 108 as indicated by the arrows commonly reference at 140 for gasket 10.

Thus, a unique gasket construction for pipe or shaft couplings and other commercial, industrial, or military applications is described which exhibits reliable sealing properties while providing for the venting of internal fluid pressure.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A gasket for interposition between a first and a second interface surface having a source of fluid therebetween, one of the interface surfaces being disposable a spaced-apart distance from the other interface surface along a longitudinal axis, and one or both of the interface surfaces being displaceable in an axial direction along said longitudinal axis towards the other interface surface, said gasket comprising:

a retainer having opposing first and second radial surfaces, each said first and second radial surfaces extending in a radial direction generally normal to said axial direction intermediate an inner perimeter and an outer perimeter which together define a closed geometry registrable between the first and second interface surfaces, said retainer including a generally annular first mounting groove formed in said first radial surface intermediate said inner and outer perimeter and extending substantially continuously along said closed geometry, said first mounting groove defining a first void volume between the first interface surface and being formed as having an axial first inner sidewall adjacent said inner perimeter and an opposing axial first outer sidewall adjacent said outer perimeter disposed a spaced-apart radial distance from said first inner sidewall, and as having a radial first groove bottom wall extending intermediate said first inner and said first outer sidewall; and a generally annular first seal element received in said first mounting groove to extend therein substantially continuously along the entirety of said closed geometry, said first seal element configured in a free state to be compressible axially intermediate said first groove bottom wall and the first interface surface into an energized state effecting a fluid-tight sealing therewith, said first seal element occupying in said energized state a filled portion of said first void volume, the remainder of said first void volume being an unfilled portion, wherein said retainer further includes one or more first channels formed into said first radial surface to extend radially through a corresponding one of said first inner and said first outer sidewall to define an opening therein, and through the adjacent one of said inner and said outer perimeter, each of said first channels being coupled through a corresponding said opening in fluid communication with said unfilled portion of said first void volume, and defining with the first interface surface a vent for relieving from said unfilled portion of said first void volume a first hydrostatic pressure developed therein from said source as said one or both of the interface surfaces are displaced in said axial direction towards the other interface surface.

2. The gasket of claim 1 wherein each said first and said second radial surface is generally planar.

3. The gasket of claim 1 wherein said first radial surface has a radial first outer portion defined between said first outer sidewall and said outer perimeter and a radial first inner portion defined between said first inner sidewall and said inner perimeter, said first outer and said first inner portion being generally coplanar and each providing a bearing surface contactible by the first interface surface delimiting the compression of said first seal element.

4. The gasket of claim 1 wherein each of said first channels is formed as having a pair of opposing axial end walls spaced-apart angularly about said longitudinal axis and disposed generally normal to said corresponding one of said first inner and said first outer sidewall, and as having a radial channel bottom wall extending intermediate said end walls.

5. The gasket of claim 4 wherein said channel bottom wall is disposed axially intermediate said first radial surface and said first groove bottom wall.

6. The gasket of claim 1 wherein said retainer is formed of a metal material.

7. The gasket of claim 6 wherein said metal material forming said retainer is selected from the group consisting of aluminum, steel, stainless steel, copper, brass, titanium, nickel, and alloys thereof.

8. The gasket of claim 1 wherein said first seal element is formed of a elastomeric material selected from the group consisting of natural rubbers and synthetic rubbers.

9. The gasket of claim 1 wherein said first seal element is configured as having one or more bead portions, each of said bead portions being contactible by the first interface surface for the compression of said first seal element and forming in the energized state thereof a radial sealing surface with the first interface surface.

10. The gasket of claim 1 wherein one of the first and second interface surfaces is located on a generally tubular member having a given inner diametric extent, and wherein said sealing assembly further comprises a generally annular elastomeric locating member supported circumferentially about the outer perimeter of said retainer, said gasket being receivable coaxially within said inner diametric extent of the tubular member and said locating member having an outer diametric extent sized to interferingly engage the inner diametric extent and retain said gasket therein when said gasket is received coaxially in the tubular member.

11. The gasket of claim 1 wherein said first and said second radial surface define a maximum axial thickness dimension of said retainer therebetween, said dimension being between about 1/16–1 inch (0.15–2.5 cm).

12. The gasket of claim 1 wherein said retainer further includes:
   a generally annular second mounting groove formed in said second radial surface intermediate said inner and outer perimeter and extending substantially continuously along said closed geometry, said second mounting groove defining a second void volume between the second interface surface and being formed as having an axial second inner sidewall adjacent said inner perimeter and an opposing axial second outer sidewall adjacent said outer perimeter disposed a spaced-apart radial distance from said second inner sidewall, and as having a radial second groove bottom wall extending intermediate said second inner and said second outer sidewall, said gasket further comprising a generally annular second seal element received in said second mounting groove to extend therein substantially continuously along the entirety of said closed geometry, said second seal element configured in a free state to be compressible axially intermediate said second groove bottom wall and the second interface surface into an energized state effecting a fluid-tight sealing therewith, said second seal element occupying in said energized state a filled portion of said second void volume, the remainder of said second void volume being an unfilled portion; and
   one or more second channels formed into said second radial surface to extend radially through a corresponding one of said second inner and said second outer sidewall to define an opening therein, and through the adjacent one of said inner and said outer perimeter, each of said second channels being coupled through a corresponding said opening in fluid communication with said unfilled portion of said second void volume, and defining with the second interface surface a vent for relieving from said unfilled portion of said second void volume a second hydrostatic pressure developed therein from said source as said one or both of the interface surfaces are displaced in said axial direction towards the other interface surface.

13. The gasket of claim 12 wherein said second mounting groove is aligned in axial registration with said first mounting groove.

14. A seal assembly comprising:
   a first and a second interface surface having a source of fluid therebetween, one said interface surface being disposable a spaced-apart distance from the other said interface surface along a longitudinal axis, and one or both said interface surface being displaceable in an axial direction along said longitudinal axis towards the other said interface surface; and
   a gasket interposable between said first and said second interface surface, said gasket comprising:
      a retainer having opposing first and second radial surfaces, each said first and second radial surfaces extending in a radial direction generally normal to said axial direction intermediate an inner perimeter and an outer perimeter which together define a closed geometry registrable between said first and said second interface surface, said retainer including a generally annular first mounting groove formed in said first radial surface intermediate said inner and outer perimeter and extending substantially continuously along said closed geometry, said first mounting groove defining a first void volume between said first interface surface and being formed as having an axial first inner sidewall adjacent said inner perimeter and an opposing axial first outer sidewall adjacent said outer perimeter disposed a spaced-apart radial distance from said first inner sidewall, and as having a radial first groove bottom wall extending intermediate said first inner and said first outer sidewall; and
      a generally annular first seal element received in said first mounting groove to extend therein substantially continuously along the entirety of said closed geometry, said first seal element configured in a free state to be compressible axially intermediate said first groove bottom wall and said first interface surface into an energized state effecting a fluid-tight sealing therewith, said first seal element occupying in said energized state a filled portion of said first void volume, the remainder of said first void volume being an unfilled portion,
      wherein said retainer further includes one or more first channels formed into said first radial surface to extend radially through a corresponding one of said first inner and said first outer sidewall to define an opening therein, and through the adjacent one of said inner and said outer perimeter, each of said first channels being coupled through a corresponding said opening in fluid communication with said unfilled portion of said first void volume, and defining with said first interface surface a vent relieving from said unfilled portion of said first void volume a first hydrostatic pressure developed therein from said source as said one or both said interface surface is displaced in said axial direction towards the other said interface surface.

15. The seal assembly of claim 14 wherein each said first and said second radial surface is generally planar.

16. The seal assembly of claim 14 wherein said first radial surface has a radial first outer portion defined between said first outer sidewall and said outer perimeter and a radial first inner portion defined between said first inner sidewall and said inner perimeter, said first outer and said first inner portion being generally coplanar and each providing a bearing surface contactible by said first interface surface delimiting the compression of said first seal element.

17. The seal assembly of claim 14 wherein each of said first channels is formed as having a pair of opposing axial end walls spaced-apart angularly about said longitudinal axis and disposed generally normal to said corresponding one of said first inner and said first outer sidewall, and as having a radial channel bottom wall extending intermediate said end walls.

18. The seal assembly of claim 17 wherein said channel bottom wall is disposed axially intermediate said first radial surface and said first groove bottom wall.

19. The seal assembly of claim 14 wherein said retainer is formed of a metal material.

20. The seal assembly of claim 19 wherein said metal material forming said retainer is selected from the group consisting of aluminum, steel, stainless steel, copper, brass, titanium, nickel, and alloys thereof.

21. The seal assembly of claim 14 wherein said first seal element is formed of an elastomeric material selected from the group consisting of natural rubbers and synthetic rubbers.

22. The seal assembly of claim 14 wherein said first seal element is configured as having one or more bead portions, each of said bead portions being contactible by said first interface surface for the compression of said first seal element and forming in the energized state thereof a radial sealing surface with said first interface surface.

23. The seal assembly of claim 14 wherein one of said first and said second interface surface is located on a generally tubular member having a given inner diametric extent, and wherein said sealing assembly further comprises a generally annular elastomeric locating member supported circumferentially about the outer perimeter of said retainer, said gasket being receivable coaxially within said inner diametric extent of said tubular member, and said locating member having an outer diametric extent sized to interferingly engage said inner diametric extent and retain said gasket therewithin when said gasket is received coaxially in said tubular member.

24. The seal assembly of claim 14 wherein said first and said second radial surface define a maximum axial thickness dimension of said retainer therebetween, said dimension being between about 1/16–1 inch (0.15–2.5 cm).

25. The seal assembly of claim 14 wherein said retainer further includes:
a generally annular second mounting groove formed in said second radial surface intermediate said inner and outer perimeter and extending substantially continuously along said closed geometry, said second mounting groove defining a second void volume between said second interface surface and being formed as having an axial second inner sidewall adjacent said inner perimeter and an opposing axial second outer sidewall adjacent said outer perimeter disposed a spaced-apart radial distance from said second inner sidewall, and as having a radial second groove bottom wall extending intermediate said second inner and said second outer sidewall, said gasket further comprising a generally annular second seal element received in said second mounting groove to extend therein substantially continuously along the entirety of said closed geometry, said second seal element configured in a free state to be compressible axially intermediate said second groove bottom wall and said second interface surface into an energized state effecting a fluid-tight sealing therewith, said second seal element occupying in said energized state a filled portion of said second void volume, the remainder of said second void volume being an unfilled portion; and
one or more second channels formed into said second radial surface to extend radially through a corresponding one of said second inner and said second outer sidewall to define an opening therein, and through the adjacent one of said inner and said outer perimeter, each of said second channels being coupled through a corresponding said opening in fluid communication with said unfilled portion of said second void volume, and defining with said second interface surface a vent relieving from said unfilled portion of said second void volume a second hydrostatic pressure developed therein from said source as said one or both said interface surface is displaced in said axial direction towards the other said interface surface.

26. The seal assembly of claim 25 wherein said second mounting groove is aligned in axial registration with said first mounting groove.

27. A method of sealing an assembly including a first and a second interface surface having a source of fluid therebetween, one said interface surface being disposed a spaced-apart distance from the other said interface surface along a longitudinal axis, and one or both said interface surface being displaceable in an axial direction along said longitudinal axis towards the other said interface surface; and said method comprising the steps of:

(a) providing a gasket interposed between said first and said second interface surface, said gasket comprising:
a retainer having opposing first and second radial surfaces, each said first and second radial surfaces extending in a radial direction generally normal to said axial direction intermediate an inner perimeter and an outer perimeter which together define a closed geometry registrable between said first and said second interface surface, said retainer including a generally annular first mounting groove formed in said first radial surface intermediate said inner and outer perimeter and extending substantially continuously along said closed geometry, said first mounting groove defining a first void volume between said first interface surface and being formed as having an axial first inner sidewall adjacent said inner perimeter and an opposing axial first outer sidewall adjacent said outer perimeter disposed a spaced-apart radial distance from said first inner sidewall, and as having a radial first groove bottom wall extending intermediate said first inner and said first outer sidewall; and
a generally annular first seal element received in said first mounting groove to extend therein substantially continuously along the entirety of said closed geometry, said first seal element configured in a free state to be compressible axially intermediate said first groove bottom wall and said first interface surface into an energized state effecting a fluid-tight sealing therewith, said first seal element occupying in said energized state a filled portion of said first void volume, the remainder of said first void volume being an unfilled portion,
wherein said retainer further includes one or more first channels formed into said first radial surface to extend radially through a corresponding one of said first inner and said first outer sidewall to define an opening therein, and through the adjacent one of said inner and said outer perimeter, each of said first channels being coupled through a corresponding said opening in fluid communication with said unfilled portion of said first void volume, and defining with said first interface surface a vent relieving from said unfilled portion of said first void volume a first hydrostatic pressure developed therein from said source as said one or both said interface surface is displaced in said axial direction towards the other said interface surface, (b) displacing said one or both said interface surface in said axial direction;

(c) compressing said first seal element axially intermediate said first groove bottom wall and said first interface surface into said energized state; and (d) venting through said first channels said first hydrostatic pressure developed in said unfilled portion of said first void volume.

28. The method of claim 27 wherein each said first and said second radial surface is generally planar.

29. The method of claim 27 wherein said first radial surface has a radial first outer portion defined between said first outer sidewall and said outer perimeter and a radial first inner portion defined between said first inner sidewall and said inner perimeter, said first outer and said first inner portion being generally coplanar and each providing a bearing surface contacted in step (c) by said first interface surface delimiting the compression of said first seal element.

30. The method of claim 27 wherein each of said first channels is formed as having a pair of opposing axial end walls spaced-apart angularly about said longitudinal axis and disposed generally normal to said corresponding one of said first inner and said first outer sidewall, and as having a radial channel bottom wall extending intermediate said end walls.

31. The method of claim 30 wherein said channel bottom wall is disposed axially intermediate said first radial surface and said first groove bottom wall.

32. The method of claim 27 wherein said retainer is formed of a metal material.

33. The method of claim 32 wherein said metal material forming said retainer is selected from the group consisting of aluminum, steel, stainless steel, copper, brass, titanium, nickel, and alloys thereof.

34. The method of claim 27 wherein said first seal element is formed of an elastomeric material selected from the group consisting of natural rubbers and synthetic rubbers.

35. The method of claim 27 wherein said first seal element is configured as having one or more bead portions, each of said bead portions being contacted in step (c) by said first interface surface effecting the compression of said first seal element and forming in the energized state thereof a radial sealing surface with said first interface surface.

36. The method of claim 27 wherein one of said first and said second interface surface is located on a generally tubular member having a given inner diametric extent, and wherein said sealing assembly further comprises a generally annular elastomeric locating member supported circumferentially about the outer perimeter of said retainer, said gasket being received coaxially within said inner diametric extent of said tubular member prior to step (a), and said locating member having an outer diametric extent which interferingly engages said inner diametric extent and retains said gasket therewithin.

37. The method of claim 27 wherein said first and said second radial surface define a maximum axial thickness dimension of said retainer therebetween, said dimension being between about 1/16–1 inch (0.15–2.5 cm).

38. The method of claim 27 wherein
said retainer further includes:
a generally annular second mounting groove formed in said second radial surface intermediate said inner and outer perimeter and extending substantially continuously along said closed geometry, said second mounting groove defining a second void volume between said second interface surface and being formed as having an axial second inner sidewall adjacent said inner perimeter and an opposing axial second outer sidewall adjacent said outer perimeter disposed a spaced-apart radial distance from said second inner sidewall, and as having a radial second groove bottom wall extending intermediate said second inner and said second outer sidewall, said gasket further comprising a generally annular second seal element received in said second mounting groove to extend therein substantially continuously along the entirety of said closed geometry, said second seal element configured in a free state to be compressible axially intermediate said second groove bottom wall and said second interface surface into an energized state effecting a fluid-tight sealing therewith, said second seal element occupying in said energized state a filled portion of said second void volume, the remainder of said second void volume being an unfilled portion; and
one or more second channels formed into said second radial surface to extend radially through a corresponding one of said second inner and said second outer sidewall to define an opening therein, and through the adjacent one of said inner and said outer perimeter, each of said second channels being coupled through a corresponding said opening in fluid communication with said unfilled portion of said second void volume, and defining with said second interface surface a vent relieving from said unfilled portion of said second void volume a second hydrostatic pressure developed therein from said source as said one or both said interface surface is displaced in said axial direction towards the other said interface surface;
said second seal element is compressed in step (c) axially intermediate said second groove bottom wall and said second interface surface into said energized state; and
said second hydrostatic pressure developed in said unfilled portion of said second void volume is vented in step (d) through said second channels.

39. The method of claim 38 wherein said second mounting groove is aligned in axial registration with said first mounting groove.

* * * * *